United States Patent
Shen et al.

(10) Patent No.: US 11,842,345 B2
(45) Date of Patent: Dec. 12, 2023

(54) REWARDS FOR A VIRTUAL CASH CARD

(71) Applicant: Block, Inc., Oakland, CA (US)

(72) Inventors: Benjamin Shen, San Francisco, CA (US); Rebecca Corcillo, San Francisco, CA (US); Michael Duane, San Francisco, CA (US); Owen Jennings, San Francisco, CA (US)

(73) Assignee: Block, Inc., Oakland, CA (US)

( * ) Notice: Subject to any disclaimer, the term of this patent is extended or adjusted under 35 U.S.C. 154(b) by 13 days.

(21) Appl. No.: 17/138,694

(22) Filed: Dec. 30, 2020

(65) Prior Publication Data
US 2022/0172200 A1 Jun. 2, 2022

Related U.S. Application Data

(60) Provisional application No. 63/120,083, filed on Dec. 1, 2020.

(51) Int. Cl.
G06Q 20/38 (2012.01)
G06Q 20/36 (2012.01)
(Continued)

(52) U.S. Cl.
CPC .......... G06Q 20/387 (2013.01); G06N 20/00 (2019.01); G06Q 20/0658 (2013.01);
(Continued)

(58) Field of Classification Search
CPC ............. G06Q 20/387; G06Q 20/0658; G06Q 20/204; G06Q 20/3672; G06Q 20/3676;
(Continued)

(56) References Cited

U.S. PATENT DOCUMENTS 10,783,545 B2 * 9/2020 Swamidurai ......... G06Q 20/065
11,354,651 B2 * 6/2022 Ortiz .................... G06Q 20/023
(Continued)

FOREIGN PATENT DOCUMENTS

| KR | 20190142647 A | 12/2019 |
| KR | 20200042250 A | 4/2020 |
| KR | 20210076666 A | 6/2021 |

OTHER PUBLICATIONS

Non-Final Office Action dated Apr. 21, 2021, for U.S. Appl. No. 17/138,512, of Shen, B., et al., filed Mar. 15, 2016.
(Continued)

*Primary Examiner* — Jacob C. Coppola
*Assistant Examiner* — Vincent I Idiake
(74) *Attorney, Agent, or Firm* — Lee & Hayes, P.C.

(57) ABSTRACT

A computer-implemented method including storing assets from an external entity in a first wallet of a payment service; training a machine-learning model using transaction data, user data, and/or rewards data; determining, using the machine-learning model, reward offers personalized for a user; activating a reward offer; receiving a request to process payment for a user's payment transaction; determining that a reward configuration is applicable; determining an amount of stored assets to assign to the user and assigning the assets to a second wallet of the user, wherein assigning the amount comprises: updating, using an internal ledger, the first wallet to indicate that a portion of the stored assets is owned by the user; and updating the second wallet to indicate ownership of the amount of the asset, wherein the updating of the first wallet and the second wallet is performed without accessing the external entity when updating.

20 Claims, 11 Drawing Sheets

(51) Int. Cl.
*G06N 20/00* (2019.01)
*G06Q 20/20* (2012.01)
*G06Q 20/06* (2012.01)
*G06Q 30/0207* (2023.01)
*G06Q 20/34* (2012.01)

(52) U.S. Cl.
CPC ....... *G06Q 20/204* (2013.01); *G06Q 20/3672* (2013.01); *G06Q 20/3676* (2013.01); *G06Q 20/3678* (2013.01); *G06Q 20/3829* (2013.01); *G06Q 30/0215* (2013.01); *G06Q 20/352* (2013.01); *G06Q 2220/00* (2013.01)

(58) Field of Classification Search
CPC ........... G06Q 20/3678; G06Q 20/3829; G06Q 30/0215; G06Q 20/352; G06Q 2220/00; G06N 20/00
See application file for complete search history.

(56) References Cited

U.S. PATENT DOCUMENTS

| | | | |
|---|---|---|---|
| 2015/0324789 A1 | 11/2015 | Dvorak et al. | |
| 2017/0011460 A1 | 1/2017 | Molinari et al. | |
| 2017/0140408 A1 | 5/2017 | Wuehler | |
| 2018/0060860 A1* | 3/2018 | Tian | G06Q 20/3674 |
| 2019/0073666 A1 | 3/2019 | Ortiz et al. | |
| 2019/0147486 A1* | 5/2019 | Monaco | G07G 1/0009 705/14.38 |
| 2020/0034868 A1* | 1/2020 | Momary | G06Q 30/0229 |
| 2020/0034869 A1 | 1/2020 | Harrison | |
| 2020/0065847 A1 | 2/2020 | Harrison et al. | |
| 2020/0252216 A1* | 8/2020 | Sharma | H04L 9/0637 |
| 2020/0279249 A1 | 9/2020 | Ta | |
| 2020/0311734 A1* | 10/2020 | Mardikar | G06Q 20/4016 |
| 2021/0182272 A1* | 6/2021 | Shpurov | G06F 16/2365 |
| 2022/0138760 A1* | 5/2022 | Dipasquale | G06Q 20/38215 705/64 |
| 2022/0172194 A1 | 6/2022 | Shen et al. | |
| 2022/0415469 A1* | 12/2022 | Mason | G16H 15/00 |
| 2023/0032660 A1* | 2/2023 | Cobb | H04L 63/102 |

OTHER PUBLICATIONS

Aste et al., Blockchain Technologies: The Foreseeable Impact on Society and Industry, Published in: Computer (vol. 50, Issue: 9, pp. 18-28), Sep. 22, 2017 (https://ieeexplore.ieee.org/document/8048633) (Year: 2017).

Euler, The Token Classification Framework: A multi-Dimensional tool for understanding and classifying crypto tokens, Published—Untitled INC, Jan. 1, 2018 (http://www.untitled-inc.com/the-token-classification-framework-a-multi-dimensi anal-tool-for-understand i ng-and-classifyi ng-crypto-tokens/) (Year: 2018).

Hua, et al., "A Brief Review of Machine Learning and its Application", 2009, Information Engineering Institute Capital Normal University, entire document pertinent (Year: 2009).

T.- K. Chang, "A Secure Cloud-Based Payment Model for M-Commerce," 2013 42nd International Conference on Parallel Processing, 2013, pp. 1082-1086, doi: 10.1109/ICPP.2013.129. (Year: 2013).

International Search Report and Written Opinion for International Application No. PCT/US2021/060976, dated Mar. 16, 2022.

Non-Final Office Action dated Aug. 3, 2022, for U.S. Appl. No. 17/138,512, of Shen, B., et al., filed Dec. 30, 2020.

Non-Final Office Action dated Mar. 29, 2022, for U.S. Appl. No. 17/138,512, of Shen, B., et al., filed Dec. 30, 2020.

Final Office Action dated Jul. 26, 2021, for U.S. Appl. No. 17/138,512, of Shen, B., et al., filed Dec. 30, 2020.

* cited by examiner

Payment Service Network – Data Store Framework

Cryptocurrency Reward Flow Chart

User Interface – BTC Reward Notification

User Interface – Activity View

User Interface – BTC Wallet Access

450

User Interface – Cryptocurrency Unit Adjustment

460

REWARDS FOR A VIRTUAL CASH CARD

CROSS-REFERENCE TO RELATED APPLICATIONS

This application claims the benefit of U.S. Provisional Patent Application No. 63/120,083, entitled "CRYPTOCURRENCY REWARDS FOR A VIRTUAL CASH CARD" and filed Dec. 1, 2020, the entire contents of which are incorporated by reference herein.

BACKGROUND

A financial-service provider may issue payment cards to its users for making payments. The payment cards may be associated with reward programs or promotional offers provided by the financial-service provider. One or more merchants may also provide reward programs or promotional offers to their current or potential customers. Information about the reward programs or promotional offers may be communicated to the customers via one or more traditional or online communication methods and may be represented by one or more physical or electronic tokens. A reward or offer may be redeemed with an affirmative action by a user, such as presenting a paper-based coupon or entering a promotional code.

However, reward programs or promotional offers may not be customized to suit the interest of each individual customer, nor do they provide a universal interface to redeem cryptocurrency rewards. A customer may often be forced to use external services to redeem or otherwise retrieve cryptocurrency rewards. It may often be difficult to integrate cryptocurrency rewards for purchases made in fiat currency. Furthermore, viewing, accepting, and redeeming cryptocurrency promotional offers may often require good memory and affirmative activities by a customer and may often involve a delay or third party services. These factors all limit a customer's ability to effectively take advantage of the growing cryptocurrency market.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
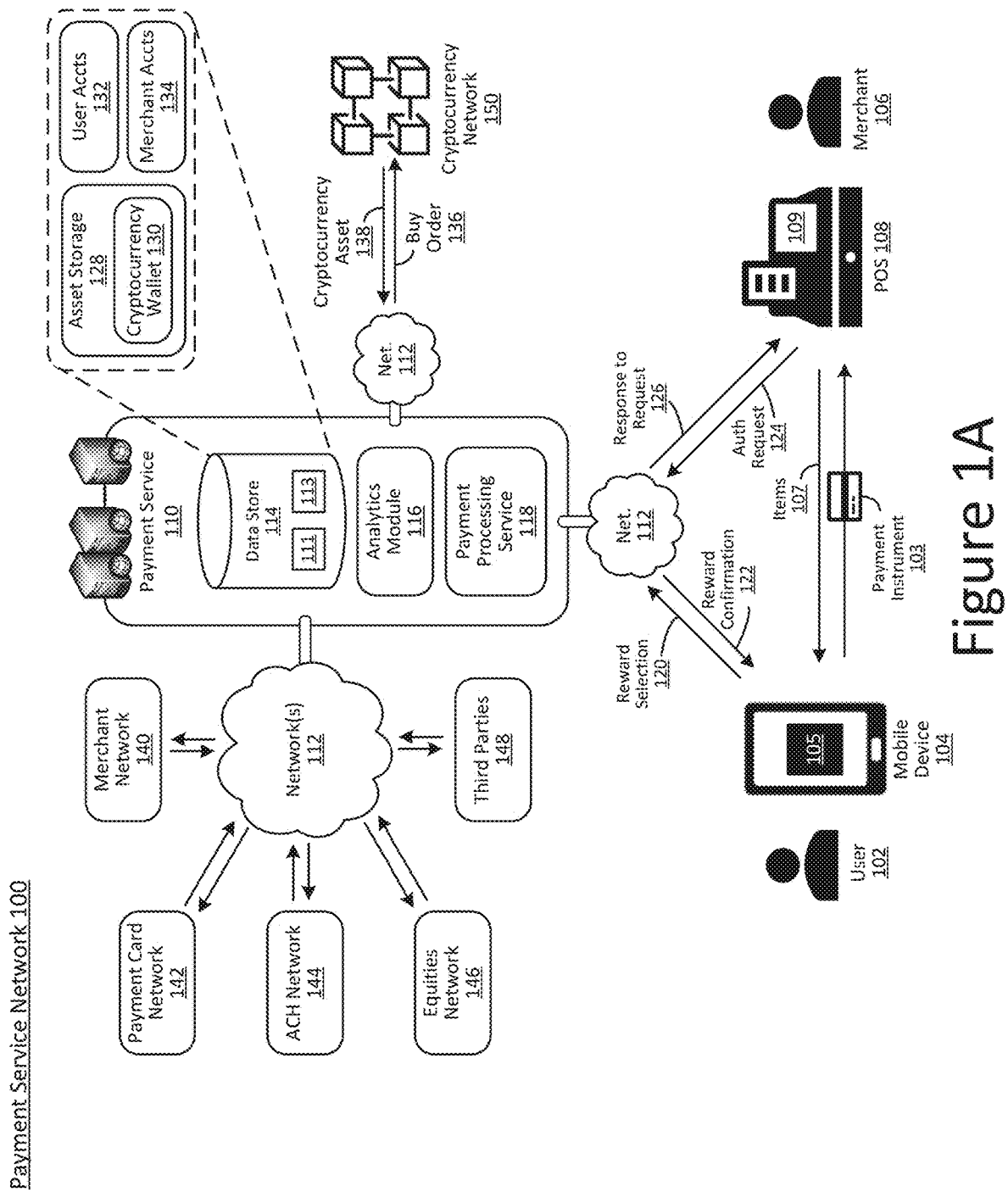
FIG. 1A illustrates a payment service network according to one example as described herein.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The present technology provides a payment server processing a payment for a point-of-sale (POS) transaction using a payment instrument associated with a user account maintained in a data store of the payment server. The payment server determines a reward configuration stored in the user account. The reward configuration includes settings to reward the user account with cryptocurrency assets and is based on historical transaction activity associated with the user account. The payment server calculates an amount of cryptocurrency assets according to the reward configuration. The amount of the cryptocurrency assets may be based on a value of the cryptocurrency at a time of the transaction. The payment server assigns the amount of cryptocurrency assets from a cryptocurrency wallet of the payment service to a cryptocurrency wallet of the user.

In another example, the present technology provides a payment server that receives a request to activate cryptocurrency rewards for a user account maintained by the payment server. The user account includes fiat currency balance. A data store maintained by the payment server, stores the cryptocurrency reward with the user account. The payment service detects a transaction involving the customer and a merchant. Upon detecting the transaction and based on the request the payment server processes a payment for a transaction using a payment instrument associated with the user account. The payment is to satisfy the transaction in fiat currency. The payment server generates in a data store, a cryptocurrency wallet on behalf of the user. The cryptocurrency wallet includes a cryptocurrency balance and is assigned to the user account of the user within the data store. The payment server assigns in the data store, a value of a cryptocurrency balance of the payment service to the cryptocurrency balance of the user. The value is associated with the transaction.

The present technology may permit a user to select how they would like to receive payment card rewards. For example, they may choose to receive rewards in USD or various other forms of currency, including a combination of one or more currencies of their choice. Currency may include fiat currency, cryptocurrency, equity value, or other monetary value that may be represented by digital asset ledgers. Examples of fiat currency may include, but are not limited to, the US Dollar, European Euro, Chinese Yuan, Japanese Yen, British Pound, as well as other government-backed currencies. Examples of cryptocurrency may include, but are not limited to, Bitcoin, Ethereum, Litecoin, Ripple, as well as other cryptography-enabled digital assets. Examples of equity value may include, but are not limited to, stockholder equity, common/preferred stock, as well as other mechanisms of owning non-cash value.

Embodiments described herein provide a number of technical benefits over prior solutions. For example, the examples of the present invention provide for instant creation of a cryptocurrency wallet at the time of a transaction that relate to the cryptocurrency reward as managed by the payment service. This helps conserve memory usage for the payment server since the cryptocurrency wallet is not created at the time of the user requesting the crypto reward—where it may sit dormant—but when the award is applicable to a particular transaction. Furthermore, this instant or on-the-fly wallet and key generation provides enhanced security features for users, reducing the number of access points to a user account's balance and, therefore, limiting exposure to external threats.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1A illustrates a payment service network 100 in accordance with one example embodiment. According to one example, payment service network 100 includes a user 102 that provides a payment instrument 103 (e.g., payment card, NFC-enabled device) to merchant 106 to initiate a payment at POS device 108 in exchange for items 107 (e.g., goods or services) offered by the merchant 106. Payment service network 100 also illustrates a payment service 110 (also referred to as a payment platform service (PPS) herein), which may include a data store 114, analytics module 116, and a payment processing service 118. In some examples, data store 114 may store therein asset storage 128, user accounts 132 and merchant accounts 134. In some examples, asset storage 128 may include a cryptocurrency wallet 130 for use by payment service 110 as a mechanism for maintaining cryptocurrency assets and communicating with cryptocurrency network 150 associated thereto.

Payment service 110 may be communicatively coupled to network(s) 112, such as the Internet, for communicating with mobile device 104 of user 102 and a merchant point of sale (POS) device 108 of merchant 106. Payment service 110 may communicate with other financial entities through network(s) 112, such as merchant network 140, payment card network 142, ACH network 144, equities network 146, and other third parties 148. In some examples, third parties 148 may include 501(c)(3) entities, non-profit organizations, or otherwise recipients of donations or in-kind gifts provided by payment service 110 and/or users or merchants thereof. Payment service 110 may further use network(s) 112 to communicate with cryptocurrency network 150. In some examples, communication with cryptocurrency network 150 may include payment service 110 directly reading and writing to the blockchain of cryptocurrency network 150. In other examples, communication with cryptocurrency network 150 may include sending and receiving data to/from one or more middle-man entities for communicating with cryptocurrency network 150 on behalf of payment service 110. For example, payment service 110 may communicate with a cryptocurrency exchange, marketplace, or other third-party blockchain service.

User 102 may engage with merchant 106 to initiate a transaction for items 107. For example, user 102 may provide a payment instrument 103 to merchant 106 to initiate a payment at POS device 108 in exchange for items 107. Mobile device 104 and POS device 108 may be any mobile or non-mobile device that include instances of a payment application executing thereon. For example, payment application 111 may be stored in data store 114 and provided by payment service 110 to mobile device 104 over network(s) 112. Mobile device 104 may send a download request to payment service 110. In response, payment service 110 may provide an instance of payment application 111 back to mobile device 104 for installation as payment application 105. In doing so, payment service 110 may map an identification of payment application 105 installed on mobile device 104 to one or more user accounts 132 associated with user 102.

Each instance of payment application 111 may include an indication of at least one user account of user accounts 132. For example, payment application 105 executing on mobile device 104 may include an indication one or more user accounts 132 associated with user 102. Payment application 105 may enable mobile device 104 to communicate with payment service 110 to initiate particular actions by payment service 110. For example, payment application 105 may enable user 102 to initiate payments from the balance stored in the respective user account of user accounts 132. Payment application 105 executing on first mobile device 104 may also permit mobile device 104 to adjust account settings stored in user accounts 132, communicate with other instances of payment application 111 installed on other mobile devices, or transmit data to/from other devices enabled to communicate wirelessly (e.g., NFC, Internet, etc.).

For example, payment application 105 may enable user 102 to select or otherwise apply reward configurations to payment instruments associated with the respective user account of user accounts 132, such as payment instrument 103. Using payment application 105, first user 102 may transmit from mobile device 104 to payment service 110 a reward selection 120. Reward selection 120 may include an indication of payment instrument 103, identification data associated with user 102 and/or merchant 106, a reward unit selected by the user, a specified reward amount, among other data. Payment service 110 may receive reward selection 120 from mobile device 104 and identify the associated user account of user 102 in user accounts 132. For example, payment application 105 executing on mobile device 104 may include an indication of the respective user account stored in user accounts 132. Upon receiving reward selection 120, payment service 110 may determine a reward configuration associated with payment instrument 103. Upon recording the reward configuration in user accounts 132, payment service 110 may transmit reward confirmation 122 to payment application 105. In some embodiments, reward confirmation 122 may include an indication that the reward configuration has been applied.

Merchant 106 may utilize POS device 108 for accepting payment from user 102. POS device 108 may be any mobile or non-mobile device that includes instances of a POS application 113 stored in data store 114, wherein the instance is installed locally on POS device 108 as POS application 109. POS device 108 may further include a wireless communication module with wireless communication capabilities (e.g., NFC, Bluetooth, cellular data, etc.), allowing wireless communication between POS device 108 and other devices with wireless communication capabilities. For example, POS device 108 may have an NFC-enabled chip that communicates with other NFC-enabled devices. Once installed on POS device 108, POS application 109 may enable POS functionality, such as merchant 106 (e.g., business owners, business employees, etc.) accepting payments from user 102 (e.g., customers).

In some types of businesses, POS device 108 may correspond to a store, restaurant, internet commerce site, or other place of business or website of the merchant, and thus, may be a fixed location that typically does not change on a day-to-day basis. In other types of businesses, however, the location of POS device 108 may change from time to time, such as in the case that a merchant operates a food truck, is a street vendor, is a cab driver, etc., or has an otherwise mobile business (e.g., in the case of a merchant who sells goods or services at buyers' homes, places of business, and so forth).

As used herein, a merchant may include any business engaged in the offering of goods or services for acquisition by customers. Actions attributed to a merchant may include actions performed by owners, employees, website servers, or other agents of the merchant, and thus no distinction is made herein unless specifically discussed. In addition, as used herein, a user 102 may include any entity that acquires goods or services from a merchant, such as by purchasing, renting, leasing, borrowing, licensing, or the like. Hereinafter, goods and/or services offered by merchants may be referred to as items (e.g., items 107). Thus, merchant 106 and user 102 may interact with each other to conduct a transaction in which user 102 provides payment instrument 103 to initiate a transaction at POS device 108 and, in return, acquires items 107 from merchant 106.

As used herein, a transaction may include a financial payment for the acquisition of item(s) that is conducted between user 102 and merchant 106. For example, when paying for a transaction, user 102 can provide the amount that is due to the merchant using payment instrument 103 (e.g., a debit card, a credit card, a stored-value or gift card, a check, through an electronic payment application on mobile device 104 carried by user 102, or the like). The merchant can interact with POS device 108 to issue a payment using payment instrument 103, such as by inputting (e.g., manually, via a magnetic card reader, NFC reader, or an RFID reader, etc.) identifiers associated with payment instrument 103. For example, payment instrument 103 of user 102 can be a card having one or more magnetic strips for providing card and customer information when swiped in a card reader (e.g., POS device 108). In other examples, other types of payment instruments may be used, such as smart cards having a built-in memory chip that is read when inserted into a reader, such as chips that comply with the Europay, MasterCard, Visa (EMV) standard (e.g., EMV cards), among others. In other examples, other types of payment instruments include cards or computing devices that communicate via radiofrequencies such as a radiofrequency identification tags, and near field communication devices, among others.

During the transaction, POS device 108 can determine or otherwise receive transaction information describing the transaction, such as an identifier of the payment instrument (e.g., payment card number, account credentials, or other payment device identifier), an amount of payment received from the customer, the item(s) acquired by the customer, a time, location (e.g., street address, GPS coordinates, IP address, etc.) and date of the transaction, a payment card network 142 associated with payment instrument 103, an issuing bank of the payment instrument, a name or user account of the customer (e.g., user accounts 132), contact information of the customer, type of currency, IP address of POS device 108, IP address of mobile device 104, and so forth. POS device 108 can send the transaction information to payment service 110 over network(s) 112, either substantially contemporaneously with the conducting of the transaction (in the case of online transactions) or later when POS device 108 is in the online mode (in the case offline transactions).

In an offline transaction, POS device 108 may store information related to the transaction, including, but not limited to, a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with user 102, POS device 108 may provide at least a subset of the stored information to payment service 110 over network(s) 112. Communication via network(s) 112 may include POS device 108 connecting to any one or more wired or wireless networks, such as a Wi-Fi network, a cellular network, or the like. In an online transaction, POS device 108 may transmit data to payment service 110 over network 112 substantially contemporaneously with the transaction with user 102.

After receiving payment information from payment instrument 103, POS device 108 may send respective authorization requests 124, along with information related transaction information as described above, to payment service 110. As described above, payment service 110 may include payment processing service 118 and data store 114 that stores user accounts 132 and merchant accounts 134, as well as transaction histories of users and merchants.

Payment processing service 118 may function to receive the information regarding a transaction from POS device 108 and attempt to authorize payment instrument 103 used to conduct the transaction. Payment processing service 118 may then send a response 126 back to POS device 108 indicating whether payment instrument 103 has been approved or declined.

Generally, when user 102 and merchant 106 enter into an electronic payment transaction, the transaction is processed by electronically transferring funds from a financial account associated with user 102 to a financial account associated with merchant 106. As such, payment processing service 118 may communicate with one or more computing devices of a payment card network 142 (e.g., MasterCard®, VISA®) over network(s) 110 to conduct financial transactions electronically. Payment processing service 118 can also communicate with one or more computing devices of one or more banks, processing/acquiring services, or the like over the network 112. For example, payment processing service 118 may communicate with an acquiring bank, an issuing bank, and/or a bank maintaining user accounts for electronic payments. Payment processing service 118 may also communicate with, or access user and merchant accounts maintained by payment service 110.

An acquiring bank may be a registered member of a card association (e.g., Visa®, MasterCard®), and may be part of a payment card network 142. An issuing bank may issue credit cards to buyers (e.g., user 102) and may pay acquiring banks for purchases made by cardholders (e.g., user 102) to which the issuing bank has issued a payment card. Accordingly, in some examples, the computing device(s) of an acquiring bank may be included in the payment card network and may communicate with the computing devices of a card-issuing bank to obtain payment. Further, in some examples, the user 102 may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

While FIG. 1A illustrates merchants 102 sending the transaction data directly to the payment service 110 as part of the request to authorize the payment instrument 103, in some instances other entities (e.g., banks associated with the merchant 106 or with customer payment instruments 112) may provide transaction data, such as part of a batched, periodic process.

Mobile device 104 and POS device 108 may be computing devices with wireless communication capabilities (e.g., NFC, Bluetooth, cellular data, etc.), allowing wireless communication therebetween. A payment application 105 is a payment application provided by the payment service 110 and executes on a user's mobile device 104. POS device 108 can include a Point of Sale (POS) application 208 that is associated with one or more merchant systems and can be used by the customer to purchase products or services. The payment application 105 and POS application 109 can also be a website provided by payment service 110 (e.g., payment service 110), or any source website or application that provides a portal to send and accept payments for transactions using payment service 110. Applications 105 and 109 may be accessible through a web browser (e.g., Chrome® or Safari®) on the mobile device 104, according to one example. In another example, applications 105 and 109 can be software applications downloadable via an application store (e.g., Google Play Store®, Apple App Store®, etc.). Once accessed or registered into the applications 105 and 109, the web browser or application may remember the credentials (e.g., identification data 205) for subsequent visits (for example, through web browser authentication, web cookies, web history, etc.), allowing access to the applications without logging-in to an account again. The description herein is with reference to the payment application 105 and POS application 109 as installed applications; however, it will be understood that these applications as authenticated or unauthenticated applications on a web browser is within the meaning of the term.

Payment application 105 can include an electronic wallet application, money transfer application (e.g., application for sending and receiving money via email or phone), or any other application having stored therein identification data linked to user accounts of payment service 110 or other data linked to one or more payment cards and/or bank accounts, both of which may be used by the owner of the mobile device to initiate transactions. Such transactions can include traditional purchase transactions between customers and merchants or service providers, person-to-person transactions, and the like.

Payment application 105 can also be used to manage internal payment cards (i.e., payment cards issued by payment service 110 to users having a user account 132). As such, options with respect to internal payment cards can be adjusted and managed using payment application 105. For example, when a user account of user accounts 132 includes multiple payment methods (e.g., credit card, bank account, loan account, etc.), payment application 105 can set one of those payment methods to be the default method for debits or credits when using an internal payment card.

Collectively, all tools for offering payment are herein referred to as payment instruments. For example, payment instruments can refer to mobile device 104 running payment application 105, internal payment cards (e.g., provided by payment platform 110), external payment cards (e.g., provided by payment card network 142, ACH network 144), NFC-enabled payment cards, virtual payment cards, etc. The use of the term payment instrument does not imply a mechanism of use. For example, mobile device 104 may be utilized via NFC protocols (e.g., NFC Data Exchange Format (NDEF), NFC tags, etc.), or via use of software on mobile device 104 to send messages through web forms, applications, APIs, or messaging applications. As an additional example, payment cards, whether internal or external, can be presented to a merchant to be read, or a card number can be entered into a terminal under the control of the merchant or under the control of the customer. A payment instrument can include multiple payment instruments, such as when utilizing mobile device 104 to enter a payment card number. Throughout this description, specific payment instruments may be discussed, however, the specific payment instrument should not be considered limiting, and persons of ordinary skill in the art will appreciate instances in which a payment instrument such as a payment card can be substituted for another payment instrument such as a mobile device, and vice versa.

Figure 1B:
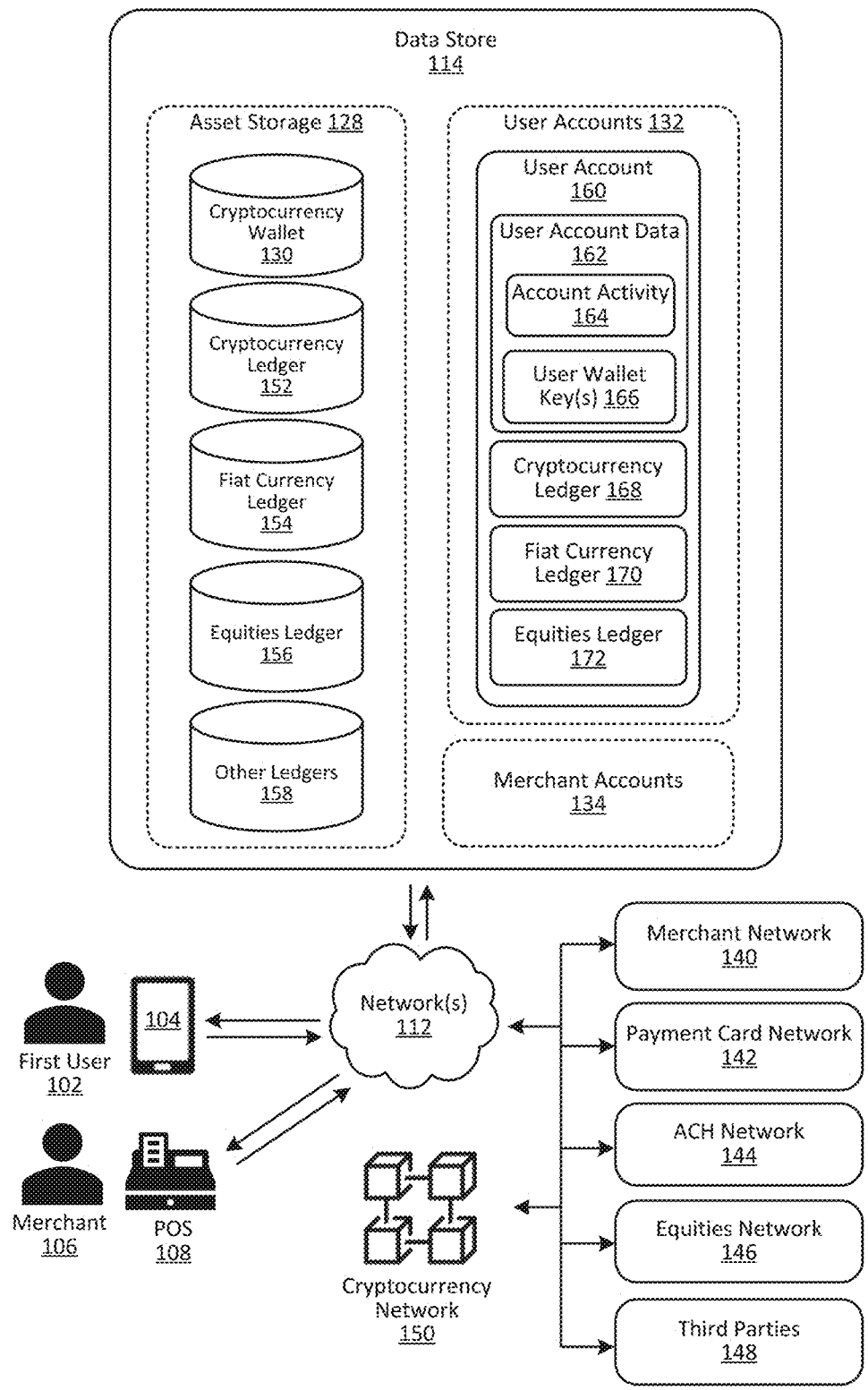
FIG. 1B illustrates a data store framework of the payment service according to one example as described herein.

FIG. 1B illustrates a data store framework of the payment service in accordance with one example embodiment. According to one example, data store 114 may store digital assets in asset storage 128, as well as data stored in user accounts 132 and merchant accounts 134, among other data. Asset storage 128 may be used to store digital assets managed by payment service 110 and record whether the digital assets are registered to users. For example, asset storage 128 may contain cryptocurrency wallet 130 for storing cryptocurrency and communicating with cryptocurrency network 150. Cryptocurrency wallet 130 can be associated with many different addresses, and can vary addresses used to acquire cryptocurrency so that its holdings are represented under a variety of addresses on cryptocurrency network 150. When payment service 110 has its own holdings of cryptocurrency, user 102 can acquire cryptocurrency directly from payment service 110. In some embodiments, payment service 110 can include logic for buying and selling cryptocurrency in order to maintain a desired level of cryptocurrency. The desired level can be based on a volume of transactions over a period, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of cryptocurrency network 150 is separate from any customer-merchant transaction, and therefore not necessarily time-sensitive.

Asset storage 128 may contain ledgers that store record assignments of digital assets to users of payment service 110. Specifically, asset storage 128 may include cryptocurrency ledger 152, fiat currency ledger 154, equities ledger 156, and other ledgers 158—each ledger can be used to record the transfer of digital assets between users of the platform (e.g., user accounts 132, merchant accounts 134) and/or external entities (e.g., 140, 142, 144, 146, 148). In doing so, asset storage 128 maintains a running balance of digital assets managed by payment service 110. The ledgers of asset storage 128 may further indicate some of the running balance for each of the digital asset ledgers stored in asset storage 128 may be assigned or registered to one or more of user accounts 132, such as user account 160.

Data store 114 may also manage user accounts 132 and merchant accounts 134. User accounts 132 may store records of user accounts associated with each user of payment service 110. For example, user accounts 132 may include user account 160 associated with user 102. Other user accounts of user accounts 132 may be similarly structured to user account 160, according to some examples. In other examples, other user accounts may include more or less accounts than that provided by user account 160. User account 160 includes user account data 162, such as account activity 164 and user wallet key(s) 166. Account activity 164 may include a transaction log for recording transactions associated with user account 160. In some examples, user wallet key(s) 166 may include a public-private key-pair and a respective address associated with the cryptocurrency network 150. User wallet key(s) 166 may include one or more key-pairs, each unique to cryptocurrency network 150 or other cryptocurrency networks.

For example, if user account 160 receives cryptocurrency (e.g., from cryptocurrency network 150), payment service 110 may credit user account 160 cryptocurrency ledger while storing the cryptocurrency data in cryptocurrency wallet 130 of payment service 110. Additionally, while payment service 110 recognizes that user account 160 retains the value of the transferred cryptocurrency through crediting cryptocurrency ledger 168, any person that inspects cryptocurrency network 150 will see the cryptocurrency as having been transferred to payment service 110. In some examples, cryptocurrency wallet 130 of payment service 110 can be associated with many different addresses. In such examples, any person that inspects blockchain 220 may not easily associate all cryptocurrency stored in cryptocurrency wallet 130 as belonging to the same entity. It is this presence of a private ledger that is used for real-time transactions and maintained by the payment service 110, combined with updates to the public ledger at other times, that allows for extremely fast transactions using cryptocurrency to be achieved.

In addition to user account data 162, customer profile 132 may include a ledger for any accounts managed by payment service 110. For example, user account 160 may further include a cryptocurrency ledger 168, fiat currency ledger 170, and equities ledger 172, among others. In some examples, cryptocurrency ledger 168 may store a balance for each of the one or more cryptocurrencies (e.g., Bitcoin, Ethereum, among others) registered to user account 160. Cryptocurrency ledger 168 may further record transactions of cryptocurrency assets associated with user account 160. For example, user account 160 may receive cryptocurrency from external cryptocurrency network 150 using user wallet key(s) 166. Other ledgers may be used to record other assets registered to user account 160. For example, user account 160 may further include fiat currency ledger 170, equities ledger 172, among others.

In some examples, user wallet key(s) 166 may be generated for the user upon request. User wallet key(s) 166 may be requested by the user in order to send, exchange, or otherwise control the balance of cryptocurrency held by the platform and registered to the user. In some examples, user wallet key(s) 166 may not be generated until a user account requires. This on-the-fly wallet key generation provides enhanced security features for users, reducing the number of access points to a user account's balance and, therefore, limiting exposure to external threats.

Figure 2:
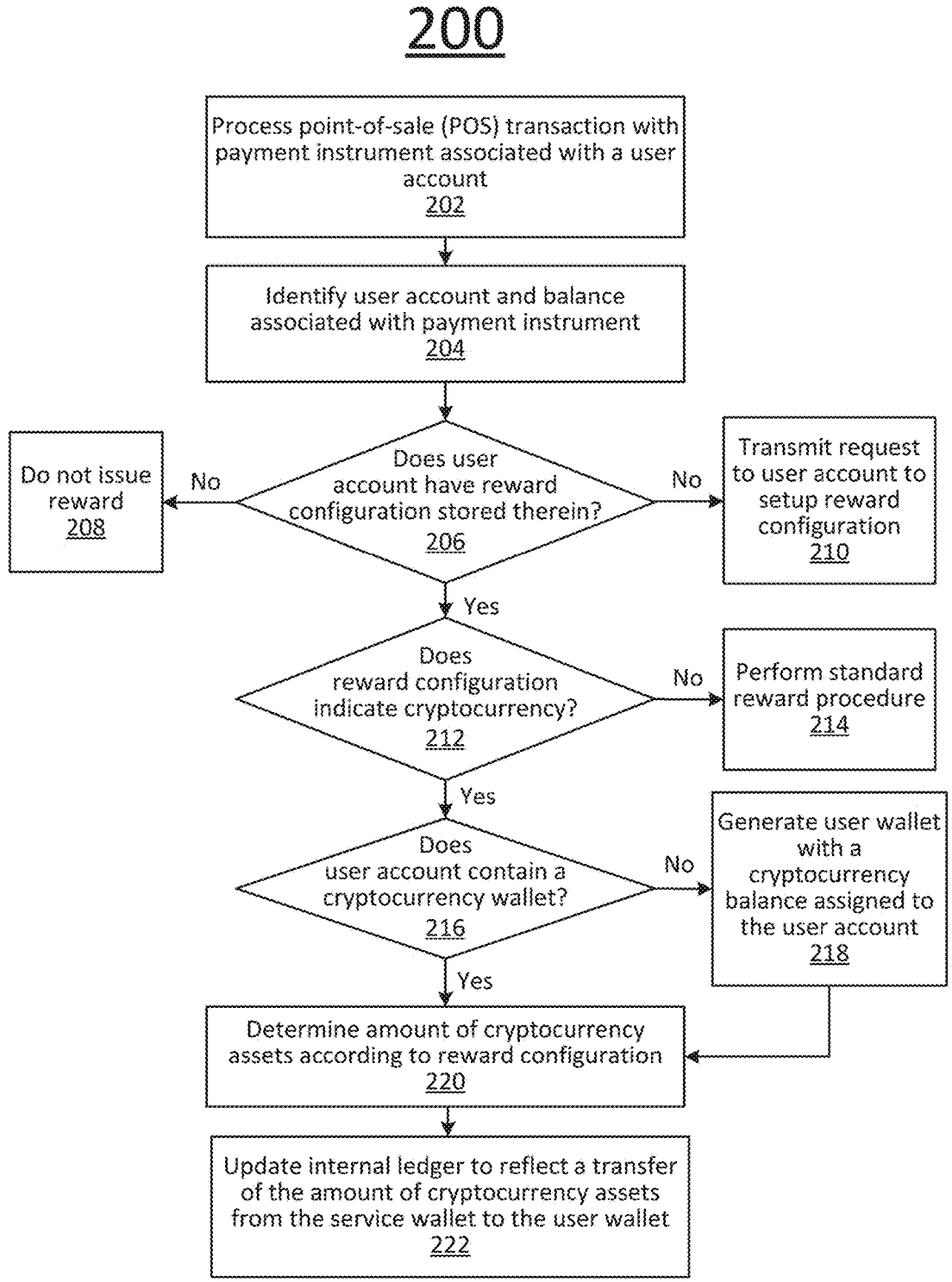
FIG. 2 illustrates a cryptocurrency reward process according to one example as described herein.

FIG. 2 illustrates a cryptocurrency reward process in accordance with one example embodiment. In some examples, cryptocurrency reward process 200 may begin with payment service 110 providing for display a virtual payment card on a user interface of payment application 105 running on mobile device 104 of user 102. The virtual payment card may correspond to a physical payment card issued to the user. The virtual payment card and the physical payment card may both be associated with user account 160 of user 102.

Cryptocurrency reward method 200 may further include the payment service system 110 identifying one or more reward offers to be provided to the user. The reward offers may be identified using machine-learning models based on information in one or more data stores associated with the payment service system 110. The information analyzed by the machine-learning model to identify reward offers may include information about one or more users, information about one or more user accounts, information about one or more merchants, information about one or more existing and available reward offers, other suitable information, or any combination thereof. For example, the information used to identify the reward offers may include demographic information associated with the user, information associated with a current time, information associated with a location of the user, historical information associated with use of the payment application 105 by the user, information associated with input by the user while using the application, or information associated with a membership status of the user. In some examples, the information may further include an indication as to whether the user account has any previous cryptocurrency activity in user account data 162.

As an example, the payment service 110 may determine that the user has recently activated cryptocurrency capabilities provided by payment service 110 and provide one or more reward offers for cryptocurrency-related products, such as cash back in the form of cryptocurrency. As an example, the payment service 110 may determine that a user has expressed interest in cryptocurrency, but has not yet activated cryptocurrency capabilities provided by payment service 110 and, therefore, provides an incentive to convert the user by offering a larger cryptocurrency-related reward (e.g., cash back, among others). In addition to cash back, cryptocurrency-related rewards may include access to advanced cryptocurrency features, premium cryptocurrency functions, or access to other cryptocurrency-related functions provided by payment service 110. For example, payment service 110 may offer better interest rates for loan products provided by payment service 110. Specifically, payment service 110 may offer user 102 a cryptocurrency-related reward such as lower interest rates for borrowing money on loan from payment service 110. As another example, payment service 110 may offer user 102 higher interest rates for storing cryptocurrency with payment service 110 or, similarly, loaning cryptocurrency to other users of payment service 110.

As yet another example, the payment service 110 may offer users fiat-related rewards, merchant-specific discounts, equity-related gifts, among other digital assets. For example, payment service 110 may identify a plurality of reward offers related to Christmas for provision to a plurality of users during a year-end holiday season. As an example, the payment service 110 may receive a message from a merchant about a particular promotional period and discounts provided by the merchant during the period. Based on the message, the payment service 110 may push out reward offers representing the discount to a plurality of users during the promotional period.

As an example, the payment service 110 may determine that a particular product or service offered by a particular merchant is trending at a point in time. The payment service 110 may push out one or more reward offers associated with the product or service to a plurality of users. As an example, the payment service 110 may determine from a purchase history of a user that the user has repetitively made payments at a particular category of merchants, the payment service 110 may provide the user targeted reward offers for merchants in this same category. As an example, the payment service 110 may determine that a user has not used the payment card for a while. The payment service 110 may provide the user a reward offer containing a credit that is applicable to any payment made using the payment card to motivate the user to use the payment card. For example, the reward offer may provide the user a $5 credit that can be redeemed against a payment made by the user using the payment card to any merchant, as long as the payment is made within the next ten days.

As another example, the payment service 110 may detect a location of a user through the payment application 105 and push to the user one or more reward offers for merchants nearby. As yet another example, the payment service 110 may determine a reward offer accepted by the user has expired and present a similar reward offer extending the term of the previously-accepted reward offer.

In particular embodiments, one or more reward offers provided to a user may be determined based on a membership status of the user. In particular embodiments, the payment service 110 may assign a membership status (e.g., Platinum, Gold, Silver) to a balance of the user account based on a plurality of factors associated with the user. The factors for a user may be, for example, a profile, an age, a location, a gender, a birth date, an address, a spending history, cryptocurrency activation status, a merchant interaction history, a reward offer usage history, a user-to-user transaction history, results of a natural-language analysis of posts by the user (e.g., text, image, emojis). In particular embodiments, the payment service may determine a number of reward offers that a user may link to her payment account based on the user's membership status and transaction history on the platform (e.g., 10 for Platinum users, 5 for Gold users, and 3 for Silver users). In particular embodiments, the payment service may customize a reward offer based on a user's membership status (e.g., 20% discount for Platinum users, 15% discount for Gold users, and 10% discount for Silver users). The payment service 110 may provide for display one or more animation effects in one or more user interfaces when a user's membership status is upgraded.

In some examples, cryptocurrency reward method 200 may further include payment service 110 sending, to the mobile device 104 associated with user 102, instructions to display the identified reward offers together with the virtual payment card in a user interface of the payment application 105. Each of the reward offers displayed may contain information about the content of the offer, a merchant associated with the offer, an expiration date of the offer, other suitable information about the offer, or any combination thereof. The payment application 105 may display multiple reward offers on a same screen or may display the reward offers one at a time and allow the user to scroll or flip through them. The user interface of the payment application 105 that displays the reward offers may be one or more interactive elements (e.g., buttons) allowing a user to accept or dismiss a reward offer. The user interface may also be configured to accept one or more gestures by the user to perform actions on the reward offers.

Cryptocurrency reward method 200 may further include payment service 110 receiving, from the mobile device 104, a user input indicating an assignment of at least one of the identified reward offers to the user account, such as a cryptocurrency-related reward. In particular embodiments, the user input may be a touch-screen gesture in a user interface. The touch-screen gesture may interact with the at least one of the reward offers or the virtual payment card. As an example, the user may select a reward offer, combining the reward offer element of the user interface with the virtual payment card to indicate assignment of the reward offer to the user account. This gesture may be detected by the mobile device 104 and forwarded to the payment service 110. In particular examples, the payment service 110 may require one or more user actions before a reward offer can be accepted. As an example, a user may be required to share a reward offer with one or more friends to enable it. The payment service 110 may determine that a reward offer is enabled based on one or more signals indicating one or more required activities by the user. In another example, a user may be required to accept terms related to the reward offer. Specifically, a user may be required to accept terms of service or other agreement terms related to cryptocurrency provided by payment service 110 in order to enable cryptocurrency-related rewards on the virtual payment card.

Cryptocurrency reward method 200 may further include payment service 110 adding, to one or more of the data stores, information associated with a connection between the user account and the at least one of the identified reward offers. The connection may authorize redeeming the reward offer upon payment for a subsequent transaction using the physical payment card. Alternatively, the reward offer may be redeemed when the virtual payment card is directly used for a payment, for example, at a point-of-sale of a merchant via an NFC-enabled card reader or similar mechanism.

In particular embodiments, after establishing and storing information about a connection between the user account and a reward offer, the payment service 110 may cause representation of the connection in a user interface of the payment application 105. The payment service 110 may send, to the mobile device 104, instructions to modify the displayed virtual payment card to reflect the connection between the user account and the at least one of the identified reward offers. As an example, the payment application 105 may display an indication of the particular cryptocurrency associated with the reward offer on top of the virtual payment card or change the color of the virtual card so as to indicate the connection between the reward offer and the virtual payment card.

In particular embodiments, a user may dismiss a reward offer after it has been linked to a payment card. The user may perform one or more actions in a user interface displayed by the payment application 105 to dismiss a reward offer (e.g., touching an "x" displayed next to the reward offer). The payment service 110 may receive a user input corresponding to dismissing one of the identified reward offers. The payment service 110 may then remove the information associated with the connection between the user account and the reward offer from the one or more data stores. The payment service 110 may also send, to the mobile device 104, instructions to remove the one of the identified reward offers from the user interface.

According to some examples, cryptocurrency reward method 200 may include all or some of the above, in addition to what is shown in FIG. 2. For example, payment application may display information associated with one or more reward offers linked to the user account. Each of the reward offers may be redeemable upon satisfaction of one or more criteria, according to some examples. In the same user interface, the payment service 110 may provide for display a virtual payment card corresponding to a physical payment card issued to the user and associated with the a particular balance stored in the respective user account.

In some examples, cryptocurrency reward method 200 may include payment service 110 receiving information about a payment initiated by a point-of-sale (POS) device (e.g., POS device 108) of the merchant using a payment instrument (e.g., virtual payment card, physical payment card) associated with the user account. The information about the payment may be received from an instance of the payment application 105 installed on a mobile device (e.g., mobile device 104) associated with a user (e.g., user 102) or a POS application (e.g., POS application 109) installed on a POS device (e.g., POS device 108) associated with a merchant (e.g., merchant 106). In particular embodiments, the user may make the payment directly using the virtual payment card. The payment may be made by placing the mobile device 104 storing information about the virtual payment card in proximity to an NFC terminal associated with the merchant. In this case, either the mobile device 104 associated with the user or a device 105 associated with the merchant may send information associated with the payment to the payment service 110. In particular embodiments, the user may make the payment using a physical payment card associated with a particular balance stored in the respective user account. The payment may be made by placing the physical payment card in contact (e.g., swipe, insert) with a POS device 108 associated with the merchant. In this case, the POS device 108 may send information associated with the payment to the payment service 110 via a network. The information may be forwarded to the mobile device 104 associated with the user.

At step 204, the payment service 110 may identify the user account associated with the particular payment instrument used in the transaction. Specifically, the payment service may identify the ledger and associated data connected to the payment instruments. At step 206, the payment service 110 may then determine whether a reward configuration is linked to the user's account that is applicable to the merchant to whom the payment was made. In particular embodiments, the payment service 110 may search through the reward configuration linked to the user account to identify such a reward offer.

Payment service 110 may further determine, based on the information about the payment and transaction data, and the information stored by the one or more data stores, whether each criterion associated with a reward configuration linked to a particular balance of the respective user account has been satisfied. As an example, the payment service 110 may first determine that the payment is made to the merchant that is associated with the reward offer. As another example, the payment service system may determine that the payment was made within a required time period, that a required product was purchased with the payment, that the payment exceeded a required minimum value, that the payment was made using a desired method, that another suitable criterion has been satisfied, or any combination thereof. If the payment service 110 determines that a criterion associated with a reward offer is not satisfied, it may proceed to step 208, where it does not issue a reward for the transaction.

In some examples, payment service 110 may proceed to step 210 where it transmits a request to the user account to request that the user setup a reward configuration. In some examples, the payment service 110 may provide retroactive rewards for selecting a reward configuration. In some examples, payment service 110 may not provide rewards for selecting a reward configuration after a transaction has been initiated.

If the payment service 110 determines that the transaction meets the criterion of a reward configuration, it may proceed to step 212 to determine whether the reward configuration indicates cryptocurrency-related reward. If the reward configuration does not related to cryptocurrency, payment service 110 may proceed with initiating the reward for the user at step 214. Otherwise, the payment service 110 may proceed to step 216, where payment service 110 determines whether the user account has cryptocurrency capabilities. For example, payment service 110 may determine whether the associated user account contains a cryptocurrency wallet stored therein. If the user account does not contain a cryptocurrency wallet, payment service 110 may proceed to step 218 to instantaneously generate a user wallet. The user wallet may contain a wallet address and key-pair (e.g., user wallet key(s) 166) associated with cryptocurrency network 150. In some examples, the user wallet may contain a wallet address associated with an internal ledger maintained by payment service 110. In some examples, the user wallet key-pair and its respective wallet address may be instantaneously generated at a later time. For example, payment service 110 may generate the user wallet when the associated user accesses the user wallet or submits a request to access the key-pair and/or address values. As described above, payment service 110 may request the user to agree to the terms of use or other agreement associated with cryptocurrency features provided by the payment service 110.

At step 220, the payment service 110 may determine an amount of cryptocurrency assets according to the reward configuration assigned to the payment instrument and based on the transaction and payment information discussed above. In particular examples, a value may be determined based on a percentage or amount of money spent in the transaction. In other examples, the value may be indirectly determined or otherwise set at a static value. In some examples, the value may be determined or otherwise calculated in an amount of cryptocurrency assets.

As an example, the payment service 110 may send to a user a reward offer that would apply to payments to a particular category of merchants (e.g., coffee merchants). The user may have made a qualifying payment to a merchant of the category (e.g., a local coffee shop). However, the payment service 110 initially may not recognize the merchant as qualifying and may not redeem the reward offer on the qualifying payment. One or more user interfaces of the payment application 105 may be one or more interactive elements allowing the user to report issues related to redemption of reward offers. The interactive elements may be associated with the reward offers or a displayed purchase history of the user. The payment service 110 may receive a message or notification from the mobile device 104 of the user indicating that the reward offer should have but was not applied. The message or notification may be triggered by one or more user inputs in the payment application 105. In response to the message or notification, the payment service 110 may retroactively apply a reward associated with the reward offer to the payment, which may result in an increase to the user's ledger, such as cryptocurrency ledger 168.

At step 222, the payment service 110 may update the cryptocurrency ledger 152 of the payment service 110 to reflect an allocation of the determined amount of cryptocurrency assets stored by cryptocurrency wallet 130 of payment service 110 to the respective user account.

In some examples, payment service 110 may transmit to the payment application 105 installed on mobile device 104 a user interface indicating that the reward offer has been redeemed in association with the payment. In particular, payment application 105 may display one or more animation effects on the user interface in association with the virtual payment card to indicate that a reward offer has been redeemed (e.g., virtual payment card changes to a color associated with the merchant or reward type). In particular embodiments, the user interface may be or display a receipt for the payment. The receipt has information associated with the redemption of the reward offer. In particular embodiments, the payment service system may add information associated with the redemption of the reward offer to a transaction history associated with the user. It may send, to the payment application 105, a user interface displaying at least part of the transaction history. In particular embodiments, a membership status of the user may be determined based on the user's transactions history. For example, the membership status may be adjusted if the total amount of payments made by the user exceeds a threshold or if the total number of reward offers redeemed for the user exceeds a required number. In some examples, the membership status may be determined based on other factors associated with the user account, such as the user account's activity associated with particular types of digital assets. For example, a user account without any activity associated with cryptocurrency may be assigned a membership status indicative of limited cryptocurrency features, according to some examples. In some examples, a user account with a lot of activity associated with equity may be assigned a membership status indicative of advanced equity features (e.g., limit orders, option orders, trailing orders, advanced market insights, among others).

In particular examples, a reward offer may be associated with limitations such as a number-of-uses limit (e.g., five times), a time duration (e.g., one week), special dates (e.g. Valentine's Day or Thanksgiving Day), specific day/time combinations (e.g., Sunday Brunch between 10 am-2 pm or Friday Happy Hour between 5 pm-7 pm), and/or a rate limit (e.g., once a day). The reward offer may be deactivated or delinked from a corresponding balance of the user account if its limitations are reached. In particular embodiments, after a reward offer is redeemed for a number of times that equals a corresponding maximum value, the payment service 110 may delink the reward offer from the corresponding balance of the respective user account. The payment service 110 may remove information about the connection between the reward offer and the user account from one or more of the data stores. In particular embodiments, the reward offer may be delinked from the corresponding user account as soon as the offer is redeemed on a payment using either the physical payment card or the virtual payment card associated with a particular balance of the respective user account, such that an attempt to redeem the reward offer for another payment using an alternative card associated with the same user account would be denied. In particular embodiments, the payment service 110 may automatically deactivate a reward offer or delink it from the user account when a time duration associated with the reward offer has passed, regardless of whether the reward offer has been redeemed. In particular embodiments, the payment service 110 deactivate a reward offer after it has been redeemed for a certain number of times in a particular period. For example, a reward offer may be deactivated after being used once in a particular day and re-activated the next day for another redemption.

Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for redeeming a reward offer in response to a payment using the payment card including the particular steps of the method of FIG. 2, this disclosure contemplates any suitable method for redeeming a reward offer in response to a payment using the payment card including any suitable steps, which may include all, some, or none of the steps described but not shown in FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3A:
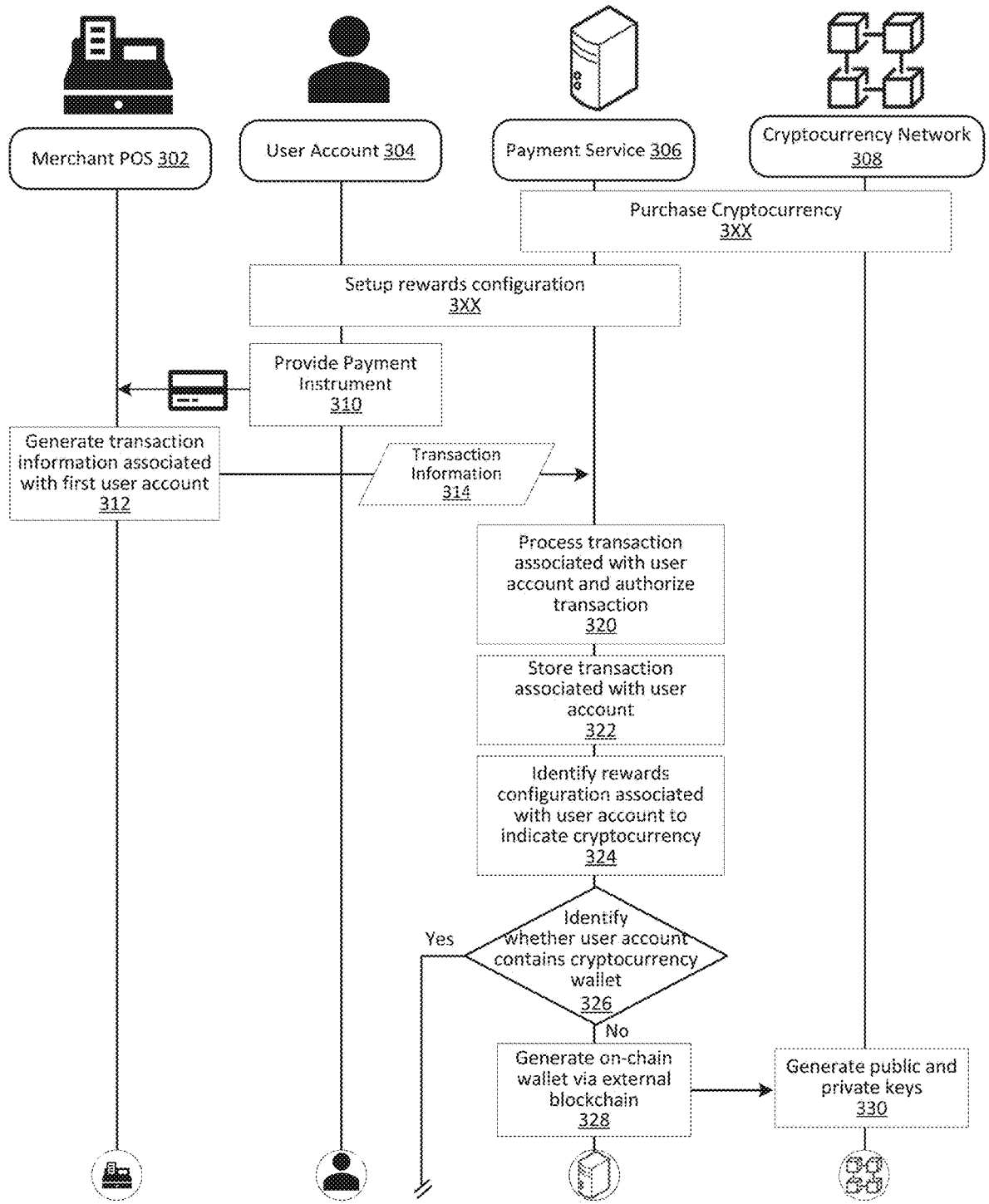
FIG. 3A illustrates a cryptocurrency reward procedure according to one example as described herein.
Figure 3B:
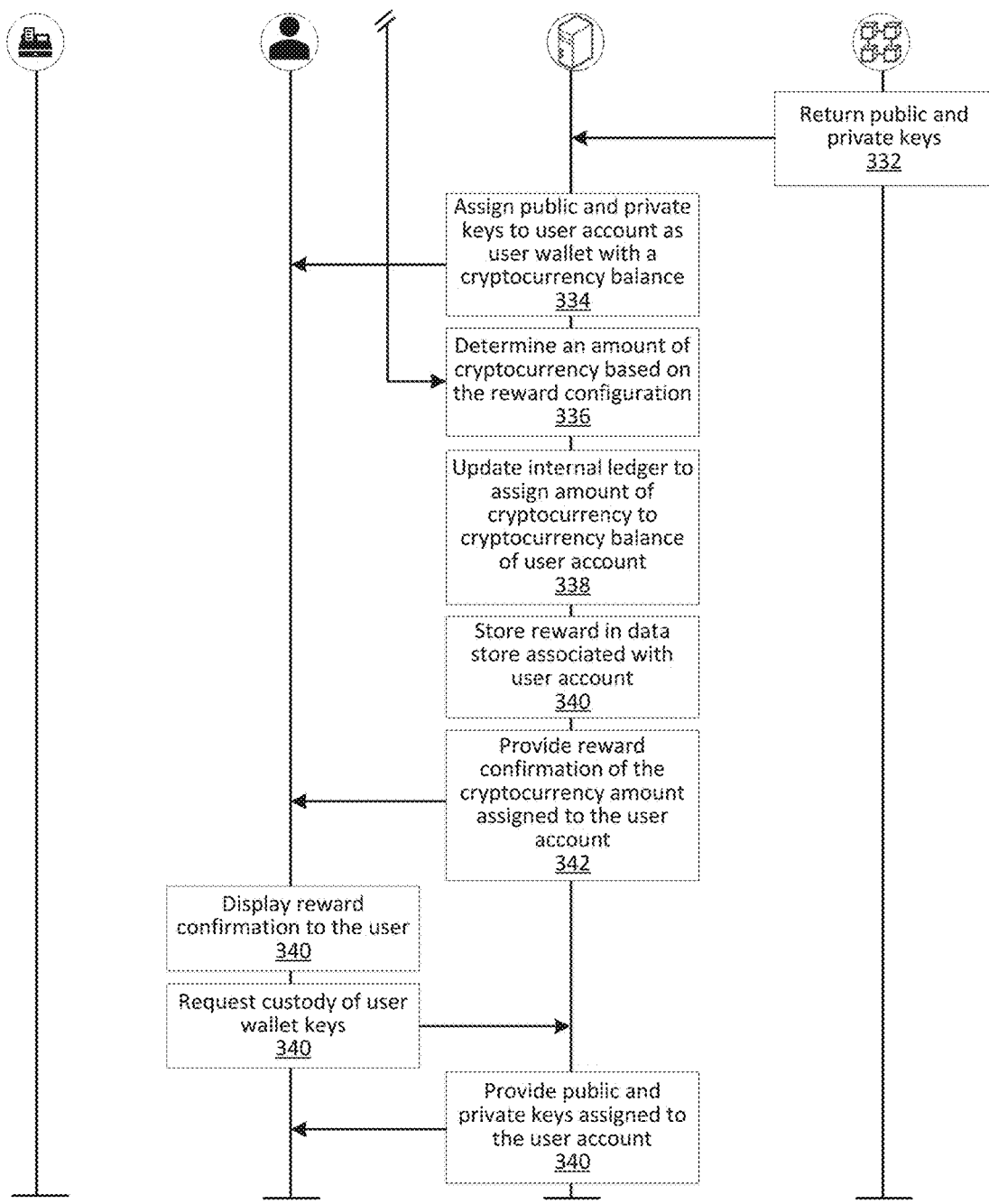
FIG. 3B illustrates a continuation of the cryptocurrency reward procedure according to one example as described herein.

FIG. 3A illustrates a cryptocurrency reward procedure in accordance with one example embodiment. According to some examples, cryptocurrency reward procedure flow 300 may include numerous devices, including POS device 302, user mobile device 304, payment service 306, and cryptocurrency network 308. In some examples, procedure flow 300 may include more or less entities than depicted in procedure flow 300. Cryptocurrency reward procedure 300 may include payment service 306 communicating with cryptocurrency network 308 (e.g., cryptocurrency network 150) to purchase or otherwise receive cryptocurrency at 309. Communicating with cryptocurrency network 308 may include reading and writing to a blockchain associated with cryptocurrency managed by the payment service 306. Alternatively, communicating with cryptocurrency network 308 may also include transmitting data to/from a cryptocurrency exchange, marketplace, and/or other third-party blockchain service to perform actions associated with the blockchain of cryptocurrency network 308.

Cryptocurrency reward procedure flow 300 may further include a rewards configuration procedure 310 between mobile device 304 and payment service 306. Specifically, rewards configuration procedure 310 may include payment service 306 generating reward offers for the particular user account associated with mobile device 304 as described in cryptocurrency reward method 200 above. Payment service 306 may transmit the generated reward offers to mobile device 304 for selection by the user. In some examples, the user may select one or more rewards offers by way of the user interface of mobile device 304. Mobile device 304 may transmit the user's one or more reward selections provided to payment service 306. Payment service 306 may store or otherwise determine from the user selections a rewards configuration for the respective payment instrument associated with the associated user account.

In some examples, cryptocurrency reward procedure flow 300 may include mobile device 304 providing a payment instrument (e.g., NFC data having payment credentials associated with a virtual payment card stored on mobile device 304) at 311. In some embodiments, payment instrument may also be a physical payment card, or other mechanism for transferring payment credentials).

According to some examples, a transaction may be initiated by a merchant's (e.g., merchant 106) POS device 302 (e.g., POS device 108) when the payment instrument is provided to POS device 302 at 311. The first payment instrument may include a physical payment card or data transmitted from mobile device 304, both of which are associated with a user account (e.g., user account 160). The payment instrument may include a wireless communication module (e.g., NFC-enabled chip, NFC tag, Bluetooth transmitter, or similar short-range communication module) in order to facilitate wireless communication. During the transaction, POS device 302 may generate (312) transaction information 314 based on payment credentials as provided by the first payment instrument associated with the user account. According to one example, the wireless communication module of the payment instrument, including a payment card and/or mobile device 304, may be programmed to enter a search mode procedure after payment credentials have been provided. According to another example, search mode may be activated by an activation mechanism incorporated into other payment instruments. Search mode as provided by the wireless communication module of the payment instrument may include actively searching for other nearby wireless communication modules to read and store data therefrom.

POS device 302 transmits transaction information 314 over a network (e.g., network 112) to payment service 306. Payment service 306 receives transaction information 314, processes and authorizes (320) the transaction using transaction information 314 through payment service 306 (e.g., payment service 110). Payment service 306 further includes user accounts (e.g., user accounts 132) associated with users of payment service 306, including a first user account (e.g., first user account 160) associated with mobile device 304 and a second user account (e.g., second user account 136) associated with a second user 324.

Upon processing and authorizing the transaction, payment service 306 deducts the total cost of the transaction from the first user account and stores (322) transaction information 314 in a transaction activity log (e.g., account activity 164) stored in the associated user account of payment service 306 for later reference. Payment service 306 may identify the rewards configuration stored in the associated user account to indicate cryptocurrency rewards at 324. In some examples, payment service 306 may determine whether or not the user account already contains a cryptocurrency wallet for the user at 326. If a user account already contains a cryptocurrency wallet, payment service 306 may proceed to step 336 of cryptocurrency reward procedure 300.

If the user account does not have a cryptocurrency wallet at 326, payment service 306 may instantly generate a user wallet (e.g., user wallet key(s) 166 and associated wallet address) associated with cryptocurrency network 308. Specifically, payment service 306 may generate a new wallet key-pair and respective wallet address according to instructions provided by the blockchain of cryptocurrency network 308. In response, cryptocurrency network 308 may push the public key to the blockchain at 330 as a new cryptocurrency wallet of its blockchain. In some examples, payment service 306 may instantly generate a wallet key-pair and address upon the user account activating the cryptocurrency features provided by payment service 306. In some embodiments, the payment service 306 may generate a user wallet key-pair and address according to instructions provided by the blockchain of cryptocurrency network 308. In some examples, because of the unique infrastructure of managing digital assets for individual user accounts, payment service 306 may wait to generate key-pairs and wallet addresses associated with cryptocurrency network 308 until the respective user requests access to user wallet credentials (e.g., public-private key-pair, wallet address, among others), such as the request at 346.

Once a wallet address is determined, payment service 306 may assign, at 334, the wallet address to a particular user account, according to some examples. At 338, payment service 306 may then determine an amount of cryptocurrency based on the reward configuration stored in the user account. In some examples, payment service 306 may update the internal ledger (e.g., cryptocurrency ledger 152) associated with tracking cryptocurrency assets managed by the platform to assign the determined amount of cryptocurrency to the user account. In some examples, payment service 306 may store the data associated with the reward (e.g., cryptocurrency assets) at step 340. For example, payment service 306 may update the cryptocurrency ledger (e.g., cryptocurrency ledger 168) of the user account to reflect a deposit in the amount of cryptocurrency. Payment service 306 may then transmit a reward confirmation of the cryptocurrency amount assigned to the user account at 342, according to some examples.

In some examples, cryptocurrency reward procedure 332 may include mobile device 304 displaying at 344 a reward confirmation for the user. The reward confirmation may indicate that cryptocurrency was assigned or otherwise allocated to the user account. In some examples, the reward confirmation may or may not include the wallet credentials as generated above. According to some examples, a user may request at 346 wallet credentials from the payment service 306 to store on their own device. Upon a user's request, payment service 306 may transmit at 348 to the user accordingly. In some examples, if a user account does not contain wallet credentials, payment service 306 may instantly generate the wallet credentials before transmitting to the user accordingly.

In some examples, assigning the wallet address to the particular user account, such as that provided at 334, may further include transmitting a copy of the public and private keys (and associated wallet address) to a device controlled by the user in order to provide users with the security and assurance provided by non-custodial services. Securely providing a user with a non-custodial wallet may include, according to some examples, encrypting the public and private keys of the wallet address for transmitting to mobile device 304. This feature enables a user to take full control of their digital assets by self-hosting their own cryptocurrency wallet and reduces congestion of the payment service. By waiting to generate cryptocurrency wallet credentials and implementing the present instantaneous wallet generation upon the user's request reduces the number of wallets associated with external blockchains, such as cryptocurrency network 308, providing limited access points to cryptocurrency assets managed by the payment service 306. This feature not only enhances network security of payment service 306, but reduces the processing power to implement the present disclosure.

Figure 4A:
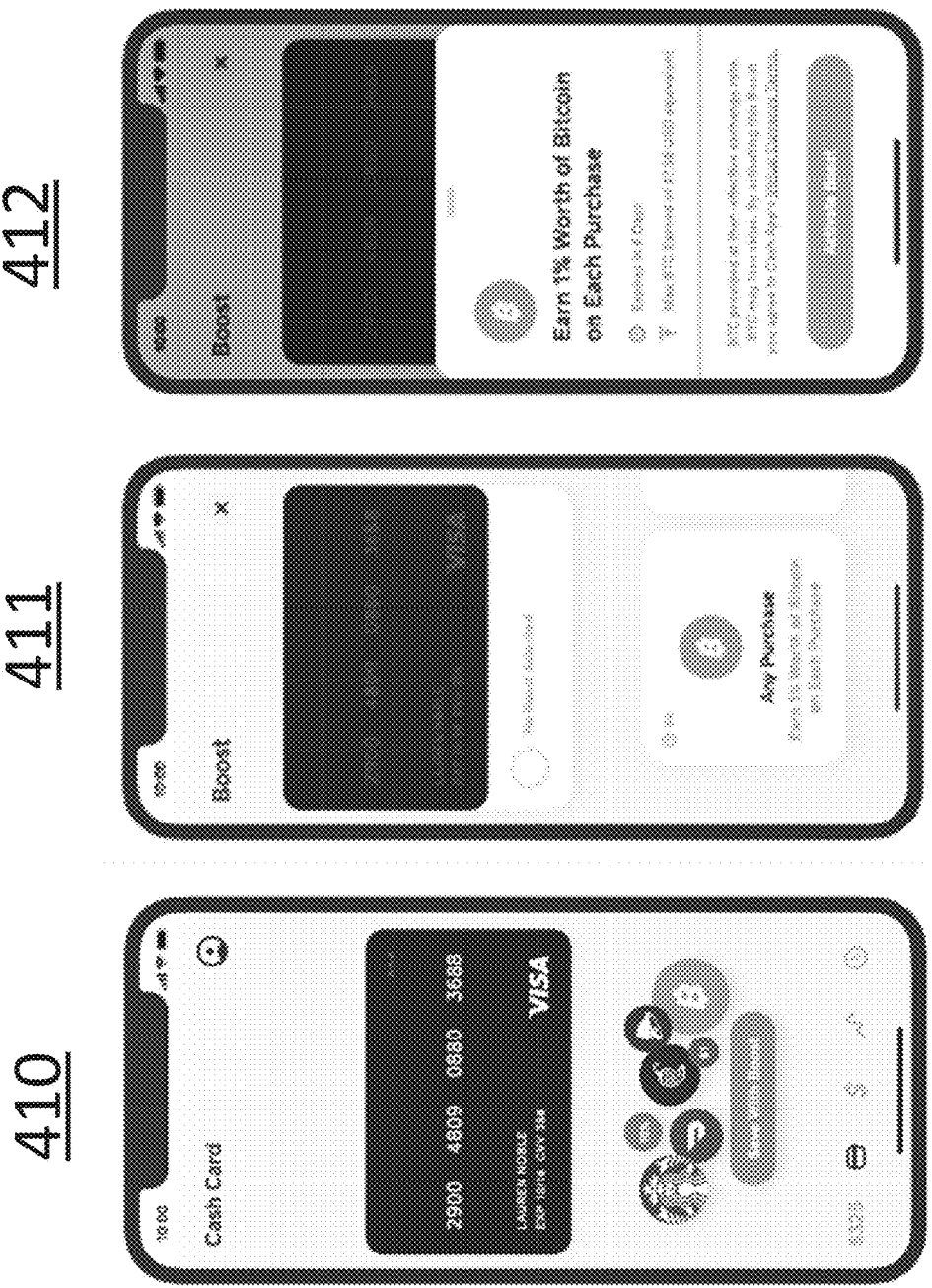
FIG. 4A illustrates graphical user interfaces for activating cryptocurrency rewards according to some examples as described herein.

FIG. 4A illustrates graphical user interfaces for activating cryptocurrency rewards in accordance with one example embodiment. In some examples, the GUI 410 displays a virtual payment card 411 and a button 412 to activate the rewards functionality of the present disclosure (e.g., "Save with Boost"). In some examples, GUI 415 displays a virtual payment card 416 with an empty field 417 representing a rewards configuration attached thereto. Virtual payment card 416 may display below a card carousel 417, each element or card of the carousel representing one or more reward offers. For example, reward offer card 418 indicates a cryptocurrency reward. By selecting reward offer card 418, GUI 420 may be displayed to the user, wherein information 421 associated with the reward offer card 418 can be displayed to the user. GUI 420 may include an activate button 422 for the user to select the reward offer card 418 as the reward configuration.

Figure 4B:
FIG. 4B illustrates graphical user interfaces for cryptocurrency reward notifications according to some examples as described herein.

FIG. 4B illustrates graphical user interfaces for cryptocurrency reward notifications in accordance with one example embodiment. GUI 425 may display a notification 426 on a mobile device of a user who has not yet activated cryptocurrency rewards feature in their associated account. Interacting with notification 426 may display for the first user a start page of the cryptocurrency reward activation (e.g., FIG. 4A). GUI 430 displays a notification 431 on a mobile device of a user who has just recently received a cryptocurrency reward deposited to their account.

Figure 4C:
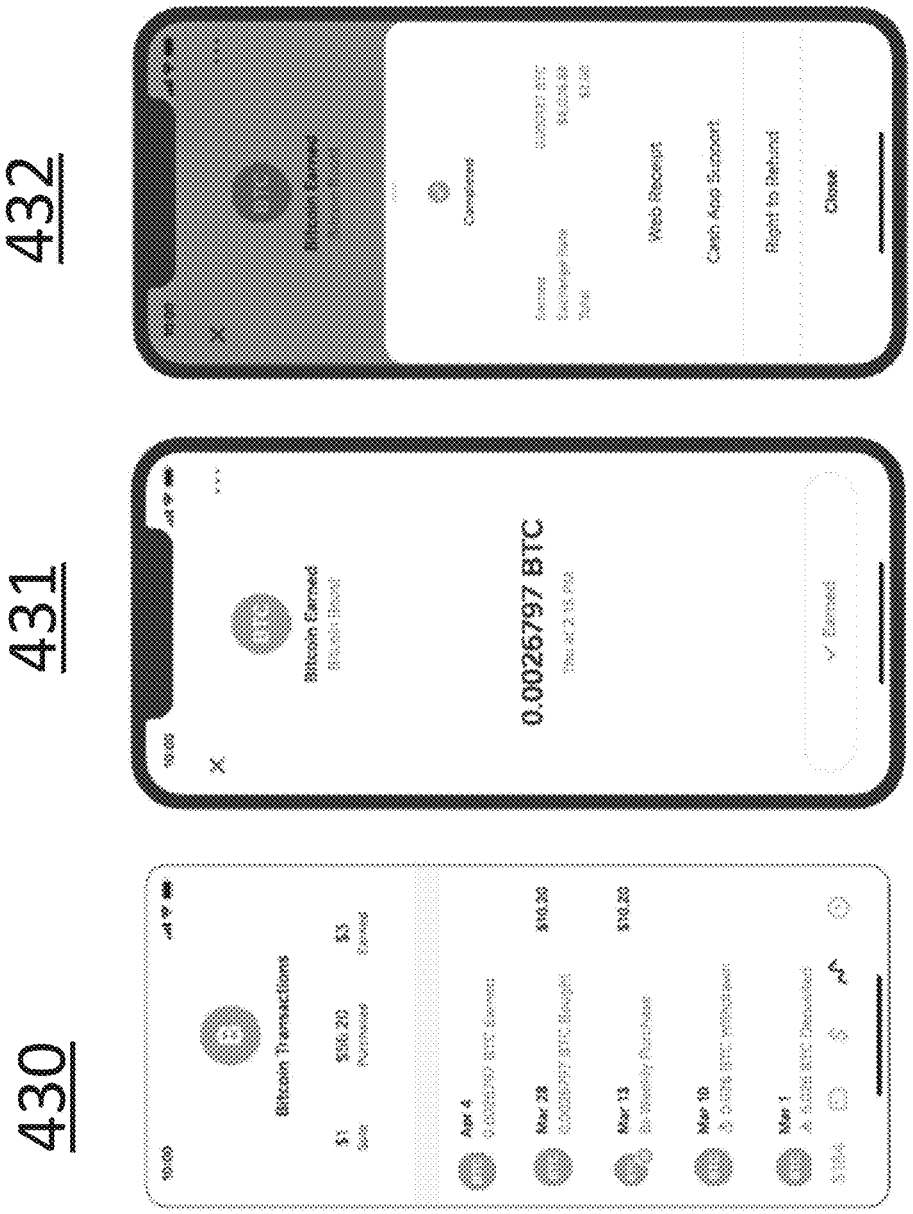
FIG. 4C illustrates graphical user interfaces for viewing cryptocurrency transactions according to some examples as described herein.

FIG. 4C illustrates graphical user interfaces for viewing cryptocurrency transactions in accordance with one example embodiment. In some examples, GUI 435 displays cryptocurrency transactions associated with the user account. Transaction 436 illustrates that cryptocurrency rewards may be listed in GUI 435 for a convenient summary of cryptocurrency transactions of the user account. GUI 440 displays cryptocurrency reward details. In some examples, GUI 440 may be displayed upon a user selecting transaction 436 of GUI 435. In some examples, GUI 445 may display details associated the earnings of a cryptocurrency reward associated with the user account.

Figure 4D:
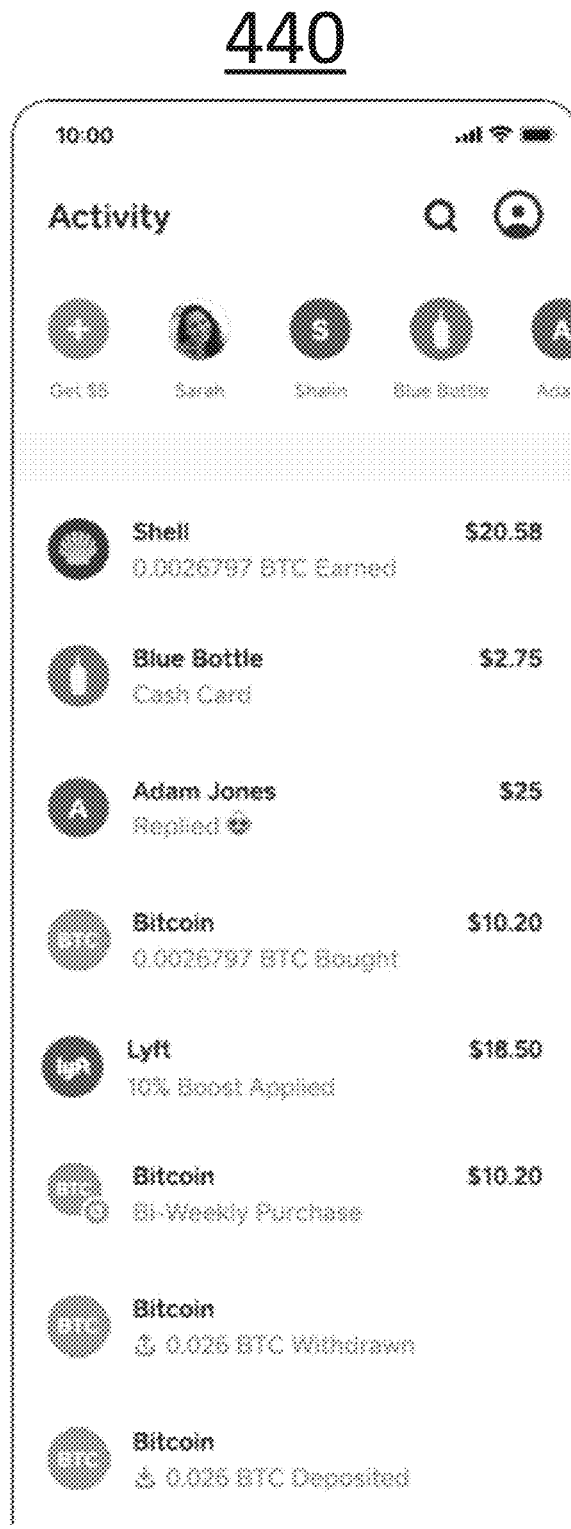
FIG. 4D illustrates graphical user interfaces for viewing user account activity according to one example as described herein.

FIG. 4D illustrates graphical user interfaces for viewing user account activity according in accordance with one example embodiment. GUI 450 may display account activity stored in the data store of the payment service. In some examples, GUI 450 may display transactions stored in the user account, including the value transacted and any rewards associated thereto. For example, transaction 451 may indicate a transaction for purchasing gas, indicating the total value of the purchase and the amount of cryptocurrency earned therefrom.

Figure 4E:
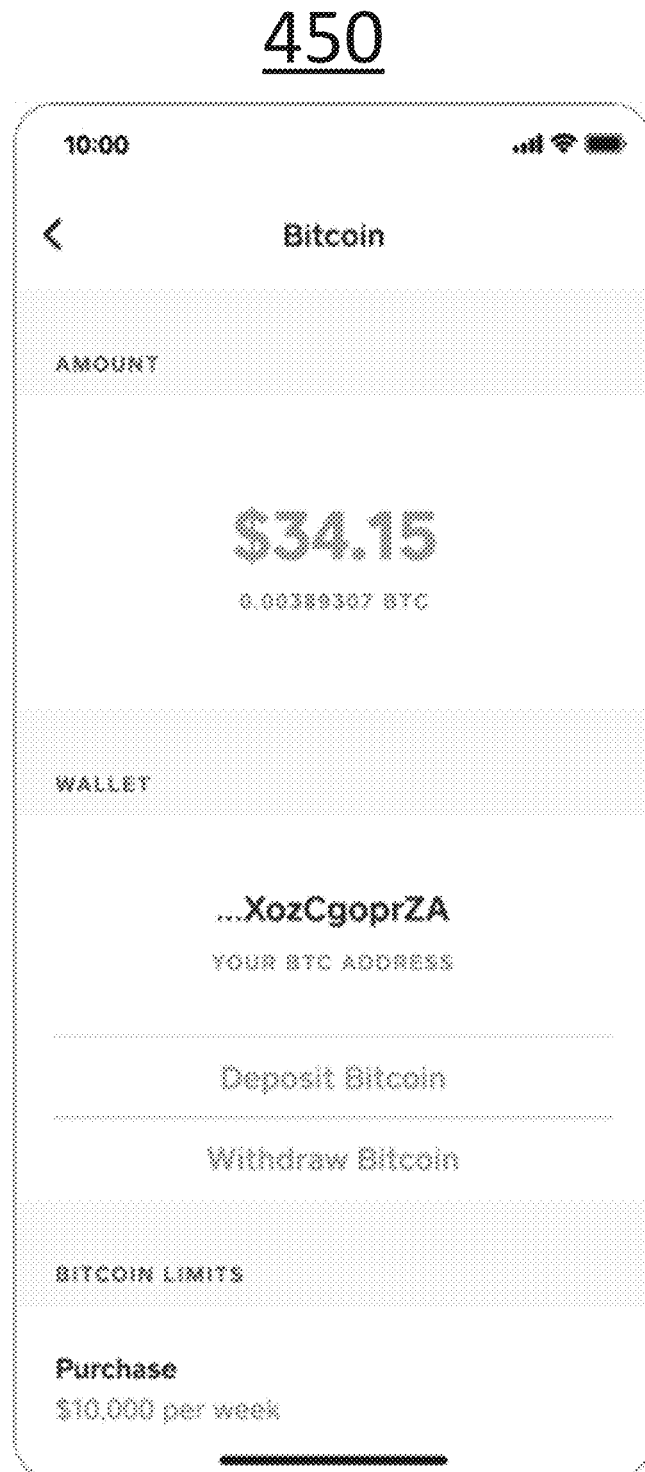
FIG. 4E illustrates a graphical user interface for accessing a user wallet address according to one example as described herein.

FIG. 4E illustrates a graphical user interface for accessing a user wallet address in accordance with one example embodiment. GUI 455 displays a cryptocurrency summary which may provide details associated with the cryptocurrency configurations of the user account. For example, GUI 455 displays a total amount 456 of cryptocurrency assigned to the user account. GUI 455 may also display cryptocurrency wallet credentials 457 associated with the user account. Specifically, cryptocurrency wallet credentials 457 provides a wallet address 458 for the respective blockchain of the associated cryptocurrency network. Other details may be provided by GUI 455, such as terms, limits, and/or other rules associated with the user account's cryptocurrency features. For example, GUI 455 displays that the user account has a particular limit for purchasing cryptocurrency (e.g., "$10,000 per week").

Figure 4F:
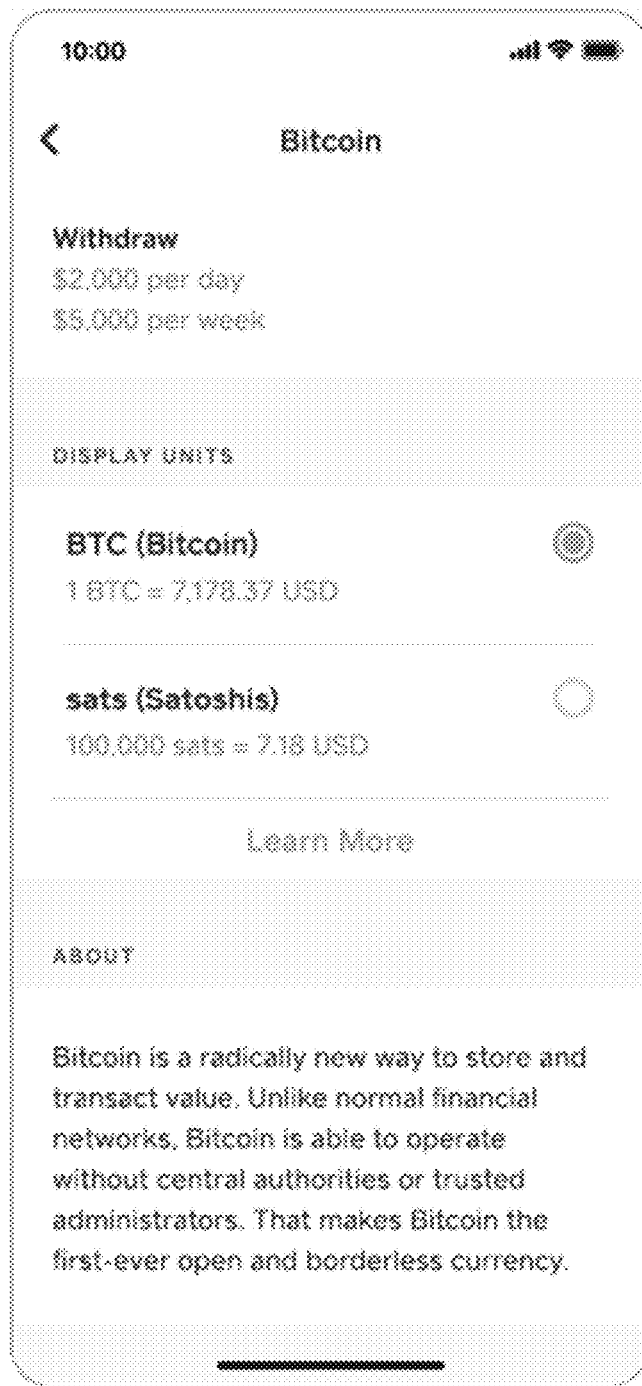
FIG. 4F illustrates a graphical user interface for adjusting cryptocurrency units to display according to one example as described herein.

FIG. 4F illustrates a graphical user interface for adjusting cryptocurrency units to display according to one example as described herein. GUI 460 may be understood as a continuation of GUI 455 or otherwise a second page for providing more details associated with the cryptocurrency configurations of the user account. For example, GUI 460 may display other cryptocurrency limitations applied to the user account. Additionally, GUI 460 may also display a selection menu for adjusting the cryptocurrency units displayed throughout the application. For example, GUI 460 provides the user with a Bitcoin selection and a Satoshi selection. GUI 460 may provide other details associated the cryptocurrency stored in the user account, such as additional historical information regarding the cryptocurrency.

For clarity of explanation, in some instances the present technology may be presented as including individual functional blocks that include devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can be, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can be hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are mechanisms for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

What is claimed is:

1. A computer-implemented method comprising:
receiving assets from an external entity for use with a payment service, wherein the assets are stored as stored assets in a first wallet of the payment service, wherein individual portions of the stored assets are assigned by the payment service to individual user accounts of users associated with the payment service using an internal ledger that is maintained by the payment service, the internal ledger comprising a plurality of transactions associated with the user accounts, the internal ledger being associated with the first wallet;
obtaining, in association with the user accounts and at least in part from a data store associated with the payment service, transaction data associated with transactions of the users, user data associated with user accounts of the users, and rewards data associated with rewards offered to users;
training a machine-learning model using training data comprising the transaction data, the user data, and the rewards data;
determining, for a first user of the users and based at least in part on the machine-learning model, one or more reward offers personalized for the first user;
causing display of a reward offer of the one or more reward offers to the first user via a display of a user device associated with an identifier of the first user, wherein the identifier is further associated with a user account of the first user;
receiving, via input to the display of the user device, an indication of actuation of an actuation mechanism corresponding to acceptance of the reward offer;
based at least in part on receiving the indication of the actuation, activating the reward offer, wherein activating the reward offer comprises storing an association between the identifier of the first user and one or more reward configurations corresponding to the reward offer;
receiving a request to process payment for a payment transaction associated with the first user, wherein the request is associated with the identifier of the first user;
determining, based at least in part on the identifier of the first user and one or more characteristics of the payment transaction, that a reward configuration of the one or more reward configurations is applicable to the payment transaction;
determining, based at least in part on the reward configuration, an amount of an asset of the stored assets to assign to the first user in association with the payment transaction; and
assigning the amount of the asset to a second wallet of the first user, wherein the second wallet is associated with the user account of the first user, and wherein assigning the amount of the asset to the second wallet comprises:
updating, using the internal ledger, the first wallet to indicate that a portion of the stored assets is owned by the first user; and
updating the second wallet to indicate ownership of the amount of the asset, wherein the amount of the asset corresponds to the portion of the stored assets, and wherein the updating of the first wallet and the second wallet is performed without accessing the external entity at a time of the updating.

2. The computer-implemented method of claim 1, wherein the asset comprises a form of currency, and wherein the form of currency comprises fiat currency, cryptocurrency, equity value, or any combination thereof.

3. The computer-implemented method of claim 2, wherein the reward configuration identifies the form of currency associated with the reward offer.

4. The computer-implemented method of claim 3, wherein the form of currency identified by the reward configuration comprises cryptocurrency, and wherein a reward associated with the reward offer comprises a portion of a total cost of the payment transaction.

5. The computer-implemented method of claim 1, wherein determining the amount of the asset is further based at least in part on a membership status of the first user with the payment service.

6. The computer-implemented method of claim 1, wherein assigning the amount of the asset to the second wallet of the first user comprises determining that a condition for assigning the amount of the asset has been satisfied, and wherein the condition comprises one or more of the first user performing a gesture, the first user sharing a reward offer with one or more other users, the first user accepting terms related to the reward offer, or one or more other actions performed by the first user.

7. The computer-implemented method of claim 1, wherein the identifier of the first user identifies a payment instrument of the first user, and wherein the payment instrument comprises at least one of a debit card, a credit card, a stored-value card, a gift card, a check, or an electronic payment application executing on a computing device associated with the first user.

8. The computer-implemented method of claim 1, wherein the one or more characteristics comprises an amount of the payment transaction.

9. The computer-implemented method of claim 1, wherein the amount of the asset is further determined based on a percentage of an amount of the payment transaction or a static value.

10. The computer-implemented method of claim 1, wherein the amount of the asset is further determined based on a currency value associated with the external entity at a time of the payment transaction.

11. The computer-implemented method of claim 1, further comprising deactivating the reward offer based at least in part on a determination that a limitation is reached, wherein the limitation comprises at least one of a number-of-uses limit, a time duration, a special date, a combination of day and time, or a rate limit.

12. A system comprising:
one or more processors; and
one or more non-transitory computer-readable media storing (i) instructions executable by the one or more processors and (ii) a machine-learning model implemented by the instructions, wherein the instructions cause the one or more processors to perform operations comprising:
receiving assets from an external entity for use with a payment service, wherein the assets are stored as stored assets in a first wallet of the payment service, wherein individual portions of the stored assets are assigned by the payment service to individual user accounts of users associated with the payment service using an internal ledger that is maintained by the payment service, the internal ledger comprising a plurality of transactions associated with the user accounts, the internal ledger being associated with the first wallet;
obtaining, in association with the user accounts and at least in part from a data store associated with the payment service, transaction data associated with transactions of the users, user data associated with user accounts of the users, and rewards data associated with rewards offered to users;
training a machine-learning model using training data comprising the transaction data, the user data, and the rewards data;
determining, for a first user of the users and based at least in part on the machine-learning model, one or more reward offers personalized for the first user;
causing display of a reward offer of the one or more reward offers to the first user via a display of a user device associated with an identifier of the first user, wherein the identifier is further associated with a user account of the first user;
receiving, via input to the display of the user device, an indication of actuation of an actuation mechanism corresponding to acceptance of the reward offer;
based at least in part on receiving the indication of the actuation, activating the reward offer, wherein activating the reward offer comprises storing an association between the identifier of the first user and one or more reward configurations corresponding to the reward offer;
receiving a request to process payment for a payment transaction associated with the first user, wherein the request is associated with the identifier of the first user;
determining, based at least in part on the identifier of the first user and one or more characteristics of the payment transaction, that a reward configuration of the one or more reward configurations is applicable to the payment transaction;
determining, based at least in part on the reward configuration, an amount of an asset of the stored assets to assign to the user in association with the payment transaction; and
assigning the amount of the asset to a second wallet of the first user, wherein the second wallet is associated with the user account of the first user, and wherein assigning the amount of the asset to the second wallet comprises:
updating, using the internal ledger, the first wallet to indicate that a portion of the stored assets is owned by the first user; and
updating the second wallet to indicate ownership of the amount of the asset, wherein the amount of the asset corresponds to the portion of the stored assets, and wherein the updating of the first wallet and the second wallet is performed without accessing the external entity at a time of the updating.

13. The system of claim 12, wherein assigning the amount of the asset to the second wallet of the first user comprises determining that a condition for assigning the amount of the asset has been satisfied, and wherein the condition comprises one or more of the first user performing a gesture, the first user sharing a reward offer with one or more other users, the first user accepting terms related to the reward offer, or one or more other actions performed by the first user.

14. The system of claim 12, wherein the identifier of the first user identifies a payment instrument of the first user, and wherein the payment instrument comprises at least one of a debit card, a credit card, a stored-value card, a gift card, a check, or an electronic payment application executing on a computing device associated with the first user.

15. The system of claim 12, wherein the amount of the asset is further determined based on a currency value associated with the external entity at a time of the payment transaction.

16. The system of claim 12, the operations further comprising deactivating the reward offer based at least in part on a determination that a limitation is reached, wherein the limitation comprises at least one of a number-of-uses limit, a time duration, a special date, a combination of day and time, or a rate limit.

17. A non-transitory computer-readable medium storing instructions that, when executed by a computer, cause the computer to perform operations comprising:
receiving assets from an external entity for use with a payment service, wherein the assets are stored as stored assets in a first wallet of the payment service, wherein individual portions of the stored assets are assigned by the payment service to individual user accounts of users associated with the payment service using an internal ledger that is maintained by the payment service, the internal ledger comprising a plurality of transactions associated with the user accounts, the internal ledger being associated with the first wallet;

obtaining, in association with the user accounts and at least in part from a data store associated with the payment service, transaction data associated with transactions of the users, user data associated with user accounts of the users, and rewards data associated with rewards offered to users;

training a machine-learning model using training data comprising the transaction data, the user data, and the rewards data;

determining, for a first user of the users and based at least in part on the machine-learning model, one or more reward offers personalized for the first user;

causing display of a reward offer of the one or more reward offers to the first user via a display of a user device associated with an identifier of the first user, wherein the identifier is further associated with a user account of the first user;

receiving, via input to the display of the user device, an indication of actuation of an actuation mechanism corresponding to acceptance of the reward offer;

based at least in part on receiving the indication of the actuation, activating the reward offer, wherein activating the reward offer comprises storing an association between the identifier of the first user and one or more reward configurations corresponding to the reward offer;

receiving a request to process payment for a payment transaction associated with the first user, wherein the request is associated with the identifier of the first user;

determining, based at least in part on the identifier of the first user and one or more characteristics of the payment transaction, that a reward configuration of the one or more reward configurations is applicable to the payment transaction;

determining, based at least in part on the reward configuration, an amount of an asset of the stored assets to assign to the first user in association with the transaction; and assigning the amount of the asset to a second wallet of the user, wherein the second wallet is associated with the user account of the first user, and wherein assigning the amount of the asset to the second wallet comprises:
  updating, using the internal ledger, the first wallet to indicate that a portion of the stored assets is owned by the first user; and
  updating the second wallet to indicate ownership of the amount of the asset, wherein the amount of the asset corresponds to the portion of the stored assets, and wherein the updating of the first wallet and the second wallet is performed without accessing the external entity at a time of the updating.

18. The computer-implemented method of claim 1, further comprising causing display of one or more other reward offers of the one or more reward offers to the first user via the display in a sequence with the reward offer, wherein the sequence is determined by the payment service.

19. The computer-implemented method of claim 1, further comprising causing display of one or more other reward offers of the one or more reward offers to the first user via the display, wherein the indication of the actuation corresponds to a plurality of reward offers, and wherein the one or more rewards configurations correspond to the plurality of reward offers.

20. The computer-implemented method of claim 1, wherein the reward offer presented to the first user is further based at least in part on at least one of a promotion, a trend, a frequency of purchase from a merchant category, a frequency of use of a payment instrument, or a location.

* * * * *